G. A. TRAUGER.
SEED CORN STRINGER.
APPLICATION FILED JAN. 23, 1917.
1,236,627.
Patented Aug. 14, 1917.
2 SHEETS—SHEET 1.
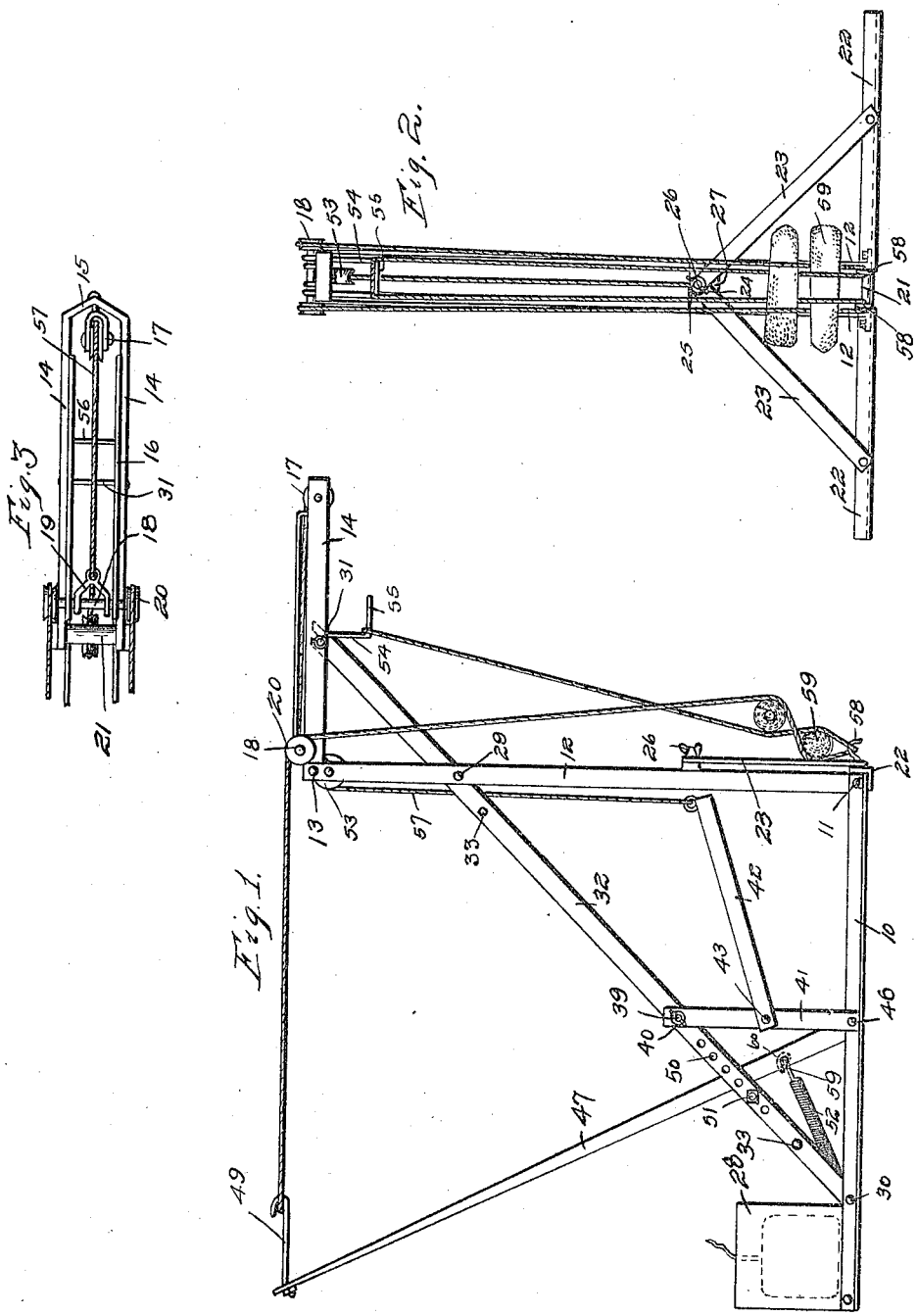
Witness
G. F. Jurechek
Inventor
Guy. A. Trauger
By Orwig & Bair
Attys.

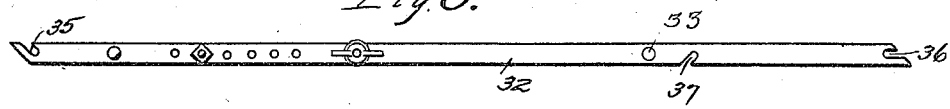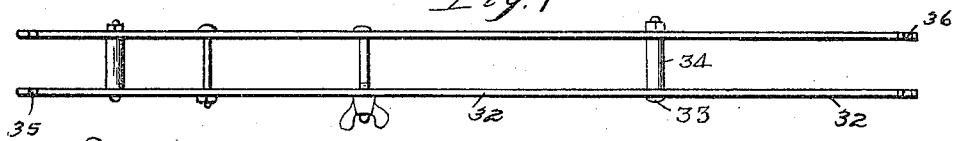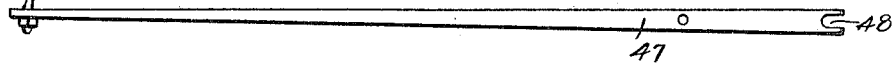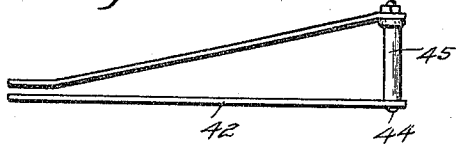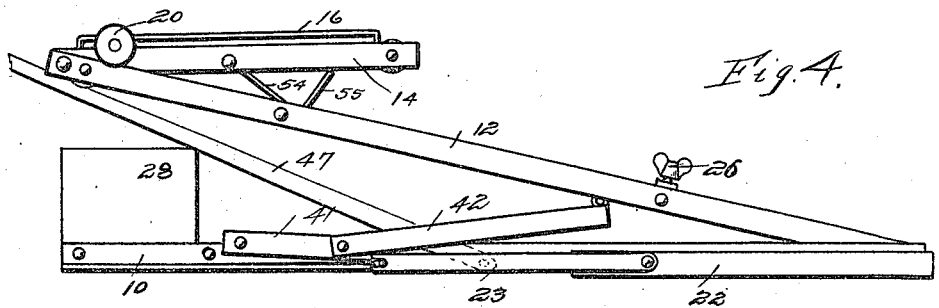

UNITED STATES PATENT OFFICE.

GUY A. TRAUGER, OF LIVERMORE, IOWA.

SEED-CORN STRINGER.

1,236,627.  Specification of Letters Patent.  Patented Aug. 14, 1917.

Application filed January 23, 1917. Serial No. 144,053.

*To all whom it may concern:*

Be it known that I, GUY A. TRAUGER, a citizen of the United States, and resident of Livermore, in the county of Humboldt and State of Iowa, have invented a certain new and useful Seed-Corn Stringer, of which the following is a specification.

The object of my invention is to provide a seed corn stringer of effective and simple construction.

A further object is to provide a seed corn stringer of the type adapted to string seed corn on loops of cord, having members adapted to reciprocate one strand of each loop.

A further object is to provide such a machine having parts so constructed and arranged as to reduce the waste of cord to a minimum.

A further object is to provide such a device so constructed and arranged that it may be readily and easily taken apart or collapsed for packing or transportation in a small space.

With these and other objects in view, my invention consists in the construction, arrangement and combination of the various parts of the device whereby the objects contemplated are attained, as hereinafter more fully set forth, pointed out in my claims and illustrated in the accompanying drawings, in which:

Figure 1 shows a side elevation of my improved seed corn stringer.

Fig. 2 shows a front elevation of the same.

Fig. 3 shows a top or plan view of part of my seed corn stringer.

Fig. 4 shows a side elevation of the same in its collapsed position.

Fig. 5 shows a top or plan view of the foot treadle.

Fig. 6 shows a plan view of the arm to which the cord is secured.

Fig. 7 shows an inverted plan view of the main supporting brace, and

Fig. 8 shows a side elevation of the main supporting brace.

In the illustration of my invention shown in the accompanying drawings, I have used the reference numeral 10 to indicate generally the lower parallel horizontal frame members which rest upon the ground or other support. There are two of the frame members 10 and they are connected by bolts or the like 11.

Pivotally connected with the forward end of each frame member 10 is an upright member 12, which upright members are connected at their upper ends by means of a bolt 13.

Pivotally mounted on the bolt 13 is an arm comprising parallel arms 14, which when the machine is in its assembled condition, extend forward in the machine, as illustrated in Fig. 1. The members 14 are connected at their forward ends by a member 15.

Secured on the upper surface of the members 14 and spaced therefrom, except at their ends, are guide members 16. Rotatably mounted between the forward ends of the members 14 is a pulley 17. Slidably mounted between the members 16 and the members 14 is a shaft 18, to which is secured a yoke or the like 19. On the outer ends of the shaft 18 outside the members 14 are pulleys 20.

On the bolts 13 and 11 are spacing sleeves 21. Pivoted to the forward ends of the members 10 to swing in a horizontal plane are supporting members 22, which when the machine is assembled, extend laterally from the members 10 for holding the device against lateral tilting.

Braces 23 are pivoted to the respective supporting members 22, and in the assembling of the machine extend upwardly and toward the center of the machine, as shown in Fig. 2, and are provided at their upper ends with elongated slots 24, open at their upper ends and designed to receive a bolt 25 on which is a thumb nut 26. The bolt 25 is mounted in a cross member 27 and by means of said bolt, the upper ends of the braces 23 are detachably secured in position for firmly bracing the members 12 and holding them in their upright position.

Resting on the rear ends of the members 10 is a twine or cord box or receptacle 28.

Supported by the members 12 near their upper portions is a transverse bolt 29. Mounted on the members 10, near their rear ends, is a transverse bolt 30.

Mounted on the members 14 between their ends is a transverse bolt 31.

For further rigidly supporting the upright members 12 in their upright positions and for supporting the members 14 in horizontal position, in the assembled machine, I have provided what I will call a main brace, comprising parallel arms 32 connected by bolts 33. On the bolts 33 between the arms 32 are spacing sleeves 34. The main brace members 32 are provided at their lower ends with slots 35 to receive the bolt 30. The main brace members 32 are spaced apart a proper distance to make them fit between the members 10 and between the members 12 and between the members 14. The brace members 32 are provided at their upper ends with slots 36 designed to receive the bolt 31.

The brace members 32 are provided at suitable points between their ends with slots 37 for receiving the bolt 29 and supporting said brace members thereon. It will be seen that when the main brace member is assembled in the position shown in Fig. 1, with the bolts 30, 29 and 31 received in the slots 35, 37 and 36, the whole machine will be rigidly supported in its assembled position.

Mounted on the members 32 between the ends thereof is a bolt 39 on which is a thumb nut 40. Pivoted to one of the members 10 is an upright arm 41 through the upper end of which the bolt 39 is extended. Pivotally supported on the arm 41 between the ends thereof is a forwardly extending foot treadle comprising spaced bars 42, the rear ends of which are mounted on a bolt 43 extended through the arm 41. The forward ends of the foot treadle are connected by a bolt 44, on which, between the members 42, is a spacing sleeve 45.

The lower end of the arm 41 is pivoted by means of a bolt 46 extended through the frame members 10.

I provide an arm 47, having at its lower end a slot 48 to receive the bolt 46, and extending upwardly and rearwardly therefrom between the brace members 32, the arm 47 has at its upper end a hook 49 or other fastening device to which the cord may be secured. The arms 32 are provided with a plurality of holes 50 which are arranged in opposite registering pairs.

Adjustably and selectively mounted in one of the openings 50 is a bolt 51 which limits the downward and rearward movement of the arm 47. A spring 52 secured to the arm 47 and to the frame of the machine yieldingly holds the arm 47 at the rearward limit of its movement.

Near the upper ends of the members 12 a pulley 53 is mounted between said members. Mounted on the bolt 31 are arms 54 which extend downwardly therefrom and have at their lower ends forward extensions 55. The forward ends of the extensions 55 are connected by a cross member 56. The members 54, 55 and 56 form a cord support.

Secured to the yoke 19 is a rope or flexible device 57, which is extended over the pulley 17, thence rearwardly on the machine and over the pulley 53, and thence downwardly to the foot treadle 42 to which said rope is secured.

In threading my seed corn stringer for use, one end of the cord to be used is secured to the hook 49 and the cord is then extended over one of the pulleys 20, thence downwardly and over a hook 58, secured at the lower forward portion of the frame, thence upwardly and over the cord holder above described, resting on the extensions 55 thereof, thence downwardly and around a hook 58, similar to that already described, and spaced laterally therefrom, thence upwardly over the other pulley 20, thence to the hook 49.

I will now describe the practical operation of my improved seed corn stringing machine.

Assuming that the machine has been assembled, as hereinbefore described, and that the shaft 18 is at its rearward position of movement where it will be normally held by means of the spring 52, an ear of corn 59 is placed between the strands of the two loops of cord at the lower ends thereof just above the hooks 58. The operator then places his foot on the treadle 42 depressing its forward end, whereupon the rope 57 will be operated for drawing the shaft 18 forwardly in the machine carrying with it the pulleys 20 and the portions of the cord extended thereover and drawing forward the upper end of the arm 47.

When the pulleys 20 are at the forward limit of their movement, it will be seen that they will have passed the cord support and a second ear of corn may be placed between the strand of the two loops, as shown in Fig. 1.

When the pressure of the foot pedal is released, it will be seen that the spring 52 will bring the arm 47 rearwardly for causing the strands of the loops to be again crossed.

It will be seen that by placing the bolt 51 in different holes 50, the length of the cord used may be regulated for varying the length of the cord when the stringing operation for each pair of loops is completed.

Another advantage inhering in my improved stringer arises from the fact that a single cord may be used for forming both loops, thereby effecting a saving of time necessary for connecting and threading the cord on the machine.

When the seed corn has been strung, my device may be readily and easily collapsed into a small space. The spring 52 has at one end a hook 59 extended over a bolt 60 mounted in the arm 47, so that the spring may be readily and easily released.

The arm 47 may then be lifted out and laid down. The thumb nut 40 may be unscrewed for removing the bolt 39, whereupon the main brace may be simply lifted out and laid down.

The forwardly extending frame members 42 and the members 14 may then drop downwardly, the thumb nut 26 may be unscrewed and the braces 23 detached from the bolt 25 and laid down parallel with the supporting members 22. The supporting members 22 may be swung horizontally rearwardly along the members 10, and the members 41 and the members 12 may then be swung downwardly and rearwardly to their positions shown in Fig. 4. The entire machine in its collapsed position may then be stored until it is again required for use.

Changes may be made in the arrangement and construction of the various parts of my improved device without departing from the essential features and purposes thereof, and it is my intention to cover by this application any such changes in construction or use of mechanical equivalents. which may be included within the scope of my claims.

I claim as my invention:

1. In a device of the class described, horizontal supporting frame members, upright frame members pivoted thereto, a forwardly extending frame member pivoted to the upper end of said upright frame members, supporting braces, means for detachably connecting said braces with said horizontal frame member, said upright members, and said forwardly extending frame, for rigidly supporting the entire device in its assembled position, and means for holding and reciprocating cord portions past each other on said device.

2. In a device of the class described, a frame having horizontal supporting members, upright members secured thereto, a forwardly extending frame at the upper end of said upright members, a sliding member mounted on said forward supporting frame, pulleys thereon, a cord supporting member on said forwardly extending frame, cord holding members at the lower end of said device, means for reciprocating said pulleys or the like past said cord supporting member, said means comprising a foot treadle, guide pulleys suitably arranged, a flexible actuating member operatively connected with said sliding member, and extended over said guide pulleys, a pivoted arm designed to be connected with the cord used for stringing corn or the like, and means for yieldingly holding said pivoted arm in one position of its movement.

3. In a device of the class described, a frame having horizontal supporting members, upright members secured thereto, a forwardly extending frame at the upper end of said upright member, a sliding member mounted on said forwardly extending frame, pulleys thereon, a cord supporting member on said forwardly extending frame, cord holder members at the lower end of said device, means for reciprocating said pulleys or the like past said cord supporting member, said means comprising a foot treadle, guide pulleys suitably arranged, a flexible member operatively connected with said sliding member, and extended over said guide pulleys, a pivoted arm designed to be connected with the cord used for stringing corn or the like, means for yieldingly holding said pivoted arm in one position of its movement, and means for limiting the movement of said pivoted arm in the direction in which it is operated by said yielding means.

4. In a device of the class described, horizontal frame members, upright frame members pivoted thereto, a frame pivoted to the upper end of said upright frame members, pulleys mounted for slidable reciprocation on said last frame, bolts or the like mounted in said horizontal frame members, and in said upright members, and in said forwardly extending frame, a main brace having slots for receiving said bolts for detachably supporting said parts in their proper positions, a cord supporting member, and a collapsible means for reciprocating said pulleys.

Des Moines, Iowa, December 26, 1916.

GUY A. TRAUGER.

Copies of this patent may be obtained for five cents each, by addressing the "Commissioner of Patents, Washington, D. C."